Patented Apr. 12, 1927.

1,624,637

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND.

DYESTUFFS AND PROCESS OF MAKING SAME.

No Drawing. Application filed March 6, 1925, Serial No. 13,626, and in Switzerland March 20, 1924.

The invention relates to new dyestuffs and intermediate products, it comprises the new dyestuffs as well as the process of making same and the material dyed or printed with the new dyestuffs.

It has been found that new dyestuffs may be obtained by preparing first the 1-hydroxynaphthalene-8-sulphamide-2-amino-4-sulphonic acid by sulphonating the 1,8-naphthsultone, treating it with agents adapted for introducing into its molecule the $-N(O)_x$ residue, wherein $x$ stands for a whole number smaller than 3, then causing ammonia to react on the sultone and finally reducing the product thus obtained, the sequence of the operations being such that the sulphonation precedes the introduction of the $-N(O)_x$ residue and that this latter operation occurs prior to the reduction, diazotizing the 1-hydroxynaphthalene-8-sulphamide-2-amino-4-sulphonic thus obtained, coupling it with coupling components and treating finally the o-hydroxyazodyestuffs thus obtained with a group of compounds comprising the salts, oxides and hydroxides of a group of metals comprising copper and chromium. According to their properties, these new dyestuffs may be employed either as acid dyestuffs, or mordant dyestuffs or printing colors; they form red-brown to black powders, dissolving in water to solutions with greenish-blue colorations and red-orange to blackish-blue coloration by addition of caustic soda, dyeing wool in an acid bath bluish-red to greenish-blue fast tints.

The following examples illustrate the invention but in no way limit it.

Example 1.

Into a cooled mixture of 2500 parts of fuming sulphuric acid containing 24 per cent of $SO_3$ and 1500 parts of sulphuric acid of 97 per cent strength, cooled to 0° C., are gradually introduced, while stirring, 3100 parts of 1,8-naphthsultone. The temperature is first allowed to rise to 20° C. and the mass is kept in a condition in which it can be stirred by adding 1500 parts of fuming sulphuric acid containing 24 per cent $SO_3$ and 1000 parts of sulphuric acid of 97 per cent strength. The sulphonation is completed by heating to 40° C. As soon as this has been achieved, which can be ascertained by seeing whether a test dissolves clearly in water, the mass is cooled to 20° C., and nitrated by the gradual addition of a mixture of 1023 parts of nitric acid, 1940 parts of sulphuric acid and 687 parts of water. After stirring for some time at 20–25° C. the whole is introduced into 2500 parts of ice water and the solution thus formed is filtered from some insoluble by-products and from the filtrate 1,8-naphthsultone-2-nitro-4-sulphonic acid is precipitated in the form of its sodium salt by adding common salt.

The said sodium salt is a yellow powder soluble in water to a greenish yellow solution, the colour of which passes to orange on addition of alkalies.

4700 parts of the said sodium salt, best in the form of the freshly precipitated paste, are introduced into 4500 parts of cooled ammonia of 25 per cent strength and the mixture is stirred for some time at 10–15° C. It forms a thin orange suspension, which is then mixed with so much dilute sulphuric acid that it becomes distinctly acid with mineral acid. The 1-hydroxynaphthalene-8-sulphamide-2-nitro-4-sulphonic acid thus precipitated in the form of its sodium salt constitutes a greenish yellow magma which is filtered and dried.

The sodium 1-hydroxynaphthalene-8-sulphamide-2-nitro-4-sulphonate is a bright yellow powder, which dissolves in cold water comparatively sparingly, but with alkalies it forms orange solutions.

4900 parts of this sodium salt are introduced into a mixture of 10,000 parts of ice water, 2500 parts of iron turnings and 500 parts of a sodium bisulphite solution of 40 per cent strength. The mixture is stirred at first in the cold and then the temperature is allowed to rise to 20–30° C. After some time the nitro-compound completely disappears. The mixture is then diluted with about an equal volume of water and heated to boiling, whereupon the iron hydroxide is completely precipitated by adding sodium carbonate, care being taken that the liquid does not become too strongly alkaline. After filtering, the solution is made distinctly acid with mineral acid and boiled until the sulphur dioxide has been expelled. On cooling 1-hydroxynaphthalene-8-sulphamide-2-amino-4-sulphonic acid crystallizes in the form of small needles, the yield of which can be increased by adding common salt.

This acid forms a bright powder somewhat soluble in water. With nitrous acid it yields a bright yellow, somewhat sparingly soluble, diazo-compound.

The same compound can be produced by first reducing 1,8-naphthsultone-2-nitro-4-sulphonic acid to the corresponding 1,8-naphthsultone-2-amino-4-sulphonic acid and then converting the latter compound into the sulphamide by means of ammonia.

The new compound corresponds with the following formula:

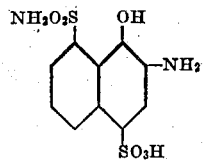

*Example 2.*

223 parts of 1-hydroxynaphthalene-8-sulphamide are introduced into a mixture of 600 parts of concentrated sulphuric acid and 100 parts of fuming sulphuric acid containing 24 per cent $SO_3$, cooled to $-5°$ C. The mixture is stirred for some hours while the temperature is allowed to rise to 10° C. until a sample is clearly soluble in dilute sodium carbonate solution. The whole is then poured into ice water and the sodium 1-hydroxynaphthalene-8-sulphamide-4-sulphonate which has been formed is completely precipitated by adding common salt.

303 parts of this sodium salt are dissolved in 4000 parts of water and 55 parts of anhydrous sodium carbonate. The solution is mixed with 70 parts of sodium nitrite and then at 0–5° C. with 1000 parts of sulphuric acid of 10 per cent strength. There separates 1-hydroxynaphthalene-8-sulphamide-2-nitroso-4-sulphonic acid in the form of a yellow brown precipitate, which on drying becomes a yellow green powder. It is sparingly soluble in water but dissolves in concentrated sulphuric acid to a green yellow solution and in dilute sodium carbonate solution to an orange solution.

250 parts of iron turnings are mixed with a little water and while stirring there are introduced gradually and alternately 333 parts of 1-hydroxynaphthalene-8-sulphamide-2-nitroso-4-sulphonic acid and 800 parts of sulphuric acid, in such a manner that the reaction of the mixture remains feebly acid and the temperature is kept between 30 and 40° C. When the reduction is complete the mass is neutralized, while hot, with sodium carbonate solution and filtered. After cooling, sodium sulphate is separated by filtration and the 1-hydroxynaphthalene-8-sulphamide-2-amino-4-sulphonic acid is isolated from the solution by acidifying.

*Example 3.*

Into a mixture of 56 parts of caustic potash, 46 parts of water and 15 parts of β-naphthol there are introduced while stirring, at a moderate temperature (about 50° C.), 35.1 parts of the diazo-compound of 1-hydroxynaphthalene-8-sulphamide-2-amino-4-sulphonic acid in the form of a paste of about 30 per cent strength. Stirring is continued at the said temperature until the diazo-compound has disappeared. The mixture is then diluted with 300 parts of water and neutralized with mineral acid which should not be too dilute; the dyestuff is finally precipitated by adding common salt.

The properties of the new dyestuff are to be learned from the table which follows.

*Example 4.*

47,3 parts of the dyestuff obtained as described in Example 3 are introduced into 400 parts of boiling water and the whole is mixed with 400 parts of a solution of chromium fluoride corresponding with 16 parts of $Cr_2O_3$. After boiling for a further time in a reflux apparatus the liquid is evaporated somewhat and the chromed dyestuff formed is precipitated by addition of common salt. It dyes wool in an acid bath very level reddish marine-blue tints which are very fast to light, fulling and alkali.

Like dyestuffs are obtained with other agents which yield chromium.

The following table sets forth the chief properties of a number of dyestuffs obtainable in accordance with this invention.

| | | | Azo-dyestuff. | | | | | |
|---|---|---|---|---|---|---|---|---|
| | Coupling component. | Appearance of the dry powder dyestuff. | Colour of the solution in— | | | Dyeings on— | | | |
| | | | Water. | Caustic soda lye. | Concentrated sulphuric acid. | Wool. | Wool, after-chromed. | Wool coppered. | Chrome printing on cotton. |
| I | α-naphthol | Blackish powder. | Blue-red. | Red-violet. | Blue. | Brownish red-violet. | Destroyed. | Dirty brown-violet. | |
| II | β-naphthol | Blackish bronze. | Blue-red. | Blue-red. | Red-violet. | Red-violet. | Blue. | | |
| III | 5,8-dichloro-α-naphthol | Dark, bronze powder. | Red-violet. | Violet. | Blackish blue. | Red-violet. | Destroyed. | Violet. | |
| IV | 2,3-hydroxynaphthoic acid | Blackish. | Violet. | Blackish violet. | Violet. | Blue-violet. | Blue, destroyed. | Blue-violet. | |
| V | 3-hydroxy-1,8-naphthalenedicarboxylic acid. | Blackish. | Blue-red. | Blue-red. | Blue. | Dull deep violet. | Green-blue. | Blue. | Pure indigo blue. |
| VI | 1-hydroxynaphthalene-4-sulphonic acid. | Blackish. | Red-violet. | Red-violet. | Blue-violet. | Red-violet. | Blue, destroyed. | Red-violet. | |
| VII | 2-hydroxynaphthalene-6-sulphonic acid. | Violet-black. | Red-violet. | Red-violet. | Brownish red-violet. | Red-violet. | Destroyed. | Violet. | |
| VIII | 1-phenyl-3-methyl-5-pyrazolone. | Orange. | Orange. | Orange-brown. | Orange-red. | Orange. | Blue-red, destroyed. | Orange-brown. | |
| IX | 1-(3'-sulphamido)-phenyl-3-methyl-5-pyrazolone. | Brown. | Orange. | Orange. | Red-orange. | Orange. | Blue-red, destroyed. | Brown-red. | |
| X | 1-(3'-nitro)-phenyl-3-methyl-5-pyrazolone. | Orange. | Orange. | Reddish orange. | Red-orange. | Orange. | Blue-red, destroyed. | Blue-red. | |
| XI | Resorcylic acid | Blackish. | Bordeaux. | Violet. | Blue-red. | Reddish brown. | Destroyed. | Violet. | Violet. |
| XII | $CH_3$—C=N—N(CH$_3$—CO)—C$_6$H$_3$(COOH)(OH) | Red-brown. | Orange. | Red-orange. | Red-orange. | Orange. | Destroyed. | | Blue-red. |
| XIII | dihydroxybenzene (OH, OH) | Blackish-brown. | Red-orange. | Blue-red. | Red. | Red-brown. | Destroyed. | | |

| Coupling component. | Chromium compounds. | | | | Copper compounds. | | | |
|---|---|---|---|---|---|---|---|---|
| | Appearance of the dry powder dyestuff. | Colour of the solution in— | | Dyeing | Appearance of the dry powder dyestuff. | Colour of the solution in— | | Dyeing on wool. |
| | | Water. | Dilute caustic soda lye. | On wool. | In cotton printing. | | Water. | Dilute caustic soda lye. | |
| I α-naphthol | Blackish powder. | Blue-violet. | Red-violet. | Blackish blue. | | Blackish powder. | Red-violet. | Red-violet. | Dull-violet. |
| II β-naphthol | Blackish. | Blue. | Violet. | Reddish dark blue. | | Blackish. | Red-violet. | Red-violet. | Red-violet. |
| III 5,8-dichloro-α-naphthol | Blackish. | Greenish blue. | Violet. | Greenish blue. | | Blackish. | Violet. | Blackish blue. | Violet. |
| IV 2,3-hydroxynaphthoic acid | Blackish. | Blue. | Violet. | Blue. | Blue. | Blackish. | Red-violet. | Blue-red. | Violet. |
| V 3-hydroxy-1,8-naphthalenedicarboxylic acid. | Blackish. | Blue. | Violet. | Blue, greenish. | Pure indigo blue. | Blackish. | Violet. | Violet. | Blue. |
| VI 1-hydroxynaphthalene-4-sulphonic acid. | Blackish. | Blue. | Red-violet. | Blue. | | Blackish. | Red-violet. | Red-violet. | Violet. |
| VII 2-hydroxynaphthalene-6-sulphonic acid. | Violet-brown. | Blue. | Red-violet. | Blue. | | Violet-brown. | Red-violet. | Red-violet. | Red-violet. |
| VIII 1-phenyl-3-methyl-5-pyrazolone | Red-brown. | Blue-red. | Red-orange. | Bluish-rose. | | Red-brown. | Red. | Red. | Blue-red. |
| IX 1-(3'-sulphamido)-phenyl-3-methyl-5-pyrazolone. | Brown-bordeaux. | Blue-red. | Red-orange. | Bluish-rose. | | Red-brown. | Red. | Red. | Blue-red. |
| X 1-(3'-nitro)-phenyl-3-methyl-5-pyrazolone. | Reddish brown. | Blue-red. | Red. | Bluish-rose. | | Brown. | Red. | | Blue-red. |
| XI Resorcylic acid | Blackish. | Violet. | Red-violet. | Blue. | Violet. | Blackish. | Red-violet. | Red-violet. | Violet. |
| XII [structure] | Red-brown. | Blue-red. | Red-orange. | Blue-red. | Blue-red. | Red-brown. | Red. | Red. | Blue-red. |
| XIII [structure] | Blackish. | Blue-red. | Blue-red. | Violet. | | Blackish. | Red-violet. | Blue-red. | Violet. |

The azodyestuff I (from α-naphthol) corresponds most probably with the following formula:

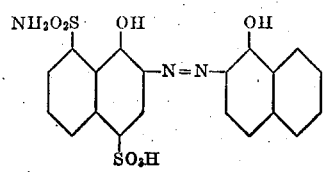

the azodyestuff II (from β-naphthol) with the following formula:

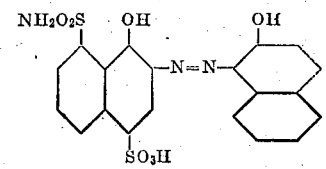

the azodyestuff VIII (from 1-phenyl-3- methyl-5-pyrazolone) with the following formula:

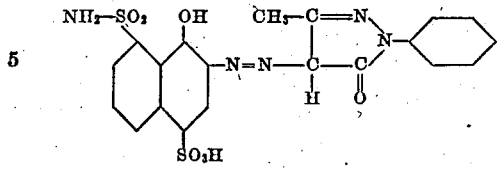

and the azodyestuff XIII (from meta-hydroxyphenol) with the following formula:

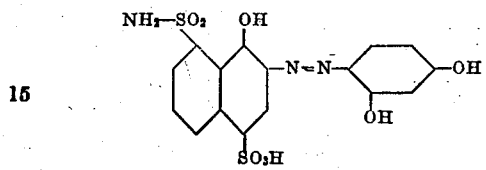

What we claim is:

1. As step in the process for the manufacture of metal compounds derived from o-hydroxyazodyestuffs the herein described process for the manufacture of 1-hydroxynaphthalene-8-sulphamide-2-amino-4-sulphonic acid by sulphonating the 1,8-naphthsultone, treating it with agents adapted to introduce into its molecule the $-N(O)_x$ residue, wherein $x$ stands for a whole number smaller than 3, then causing ammonia to react on the sultone and finally reducing the product thus obtained, the sequence of the operations being thus that the sulphonation precedes the introduction of the $-N(O)_x$ residue and that this latter operation occurs prior to the reduction.

2. As step in the process for the manufacture of metal compounds derived from o-hydroxyazodyestuffs the herein described process for the manufacture of o-hydroxyazodyestuffs consisting in diazotizing 1-hydroxynaphthalene-8-sulphamide-2-amino-4-sulphonic acid and coupling it with coupling components.

3. The herein described process for the manufacture of metal compounds deriving from o-hydroxyazodyestuffs by treating the o-hydroxyazodyestuffs from diazotized 1-hydroxynaphthalene-8-sulphamide-2-amino-4-sulphonic acid and coupling components with a group of compounds comprising the salts, hydroxides and oxides of a group of metals comprising copper and chromium.

4. The herein described process for the manufacture of chromium compounds deriving from o-hydroxyazodyestuffs by treating the o-hydroxyazodyestuffs from diazotized 1-hydroxynaphthalene-8-sulphamide-2-amino-4-sulphonic acid and coupling components with the oxides, hydroxides and salts of trivalent chromium.

5. The herein described process for the manufacture of chromium compounds deriving from o-hydroxyazodyestuffs by treating the o-hydroxyazodyestuffs from diazotized 1-hydroxynaphthalene-8-sulphamide-2-amino-4-sulphonic acid and naphthols with the oxides, hydroxides and salts of trivalent chromium.

6. As new products the herein described new compounds of a group of metals comprising copper and chromium deriving from the o-hydroxyazodyestuffs prepared from diazotized 1-hydroxynaphthalene-8-sulphamide-2-amino 4-sulphonic acid and coupling components, which products form red-brown to black powders, dissolving in water to solutions with red to greenish-blue colorations and red-orange to blackish-blue colorations by addition of caustic soda, dyeing wool in an acid bath bluish-red to greenish-blue fast tints.

7. As new products the herein described new chromium compounds deriving from the o-hydroxyazodyestuffs prepared from diazotized 1-hydroxynaphthalene-8-sulphamide-2-amino-4-sulphonic acid and coupling components, which products form red-brown to black powders, dissolving in water to solutions with bluish-red to greenish-blue colorations and red-orange to violet colorations by addition of caustic soda, dyeing wool in an acid bath bluish-pink to greenish-blue fast tints.

8. As new products the herein described new chromium compounds deriving from the o-hydroxyazodyestuffs prepared from diazotized 1-hydroxynaphthalene-8-sulphamide-2-amino-4-sulphonic acid and naphthols, which products form violet-brown to black powders, dissolving in water to solutions with bluish-violet to greenish-blue colorations and red-violet to violet colorations by addition of caustic soda, dyeing wool in an acid bath dark red-blue to greenish-blue fast tints.

9. Material dyed with the dyestuffs of claim 6.

10. Material dyed with the dyestuffs of claim 7.

11. Material dyed with the dyestuffs of claim 8.

In witness whereof we have hereunto signed our names this 20th day of February, 1925.

FRITZ STRAUB.
HERMANN SCHNEIDER.